United States Patent [19]

Mohanraj et al.

[11] Patent Number: 4,713,423

[45] Date of Patent: Dec. 15, 1987

[54] METHOD OF CHLORINATING METHYL GROUPS OF METHYL VINYL AROMATIC POLYMERS

[76] Inventors: Subramaniam Mohanraj, 6161 Shadow La., Apt. 262, Citrus Heights, Calif. 95621; Warren T. Ford, 217 S. Ridge Rd., Stillwater, Okla. 74074

[21] Appl. No.: 881,689

[22] Filed: Jul. 3, 1986

[51] Int. Cl.$^4$ .............................................. C08F 8/20
[52] U.S. Cl. ................................... 525/351; 521/53; 521/55; 525/333.4; 525/359.1; 525/359.6; 525/367
[58] Field of Search .................. 525/351, 359.1, 359.6, 525/367; 521/53, 55

[56] References Cited

U.S. PATENT DOCUMENTS

| | | | |
|---|---|---|---|
| 2,694,702 | 11/1954 | Jones | 525/333.4 |
| 2,823,201 | 2/1958 | Wheaton | 525/333.4 |
| 3,297,648 | 1/1967 | Corte et al. | 525/333.4 |
| 3,311,602 | 3/1967 | Raley, Jr. | 525/333.4 |
| 3,812,061 | 5/1974 | Barrett | 521/32 |
| 3,995,094 | 11/1976 | Crosby et al. | 525/333.4 |
| 4,192,920 | 3/1980 | Amick | 525/333.4 |
| 4,486,574 | 12/1984 | Murray | 525/333.4 |
| 4,623,609 | 11/1986 | Harita et al. | 526/247 |

*Primary Examiner*—Joseph L. Schofer
*Assistant Examiner*—Bernard Lipman
*Attorney, Agent, or Firm*—Robert B. Stevenson

[57] ABSTRACT

A method for chlorinating the pendant methyl groups of poly(p-methylstyrene) with aqueous sodium hypochlorite (e.g., laundry or swimming pool bleach) and a phase transfer catalyst (e.g., benzyltriethylammonium chloride) to provide chloromethyl-substituted polystyrenes. Conversions of up to 20 percent of methyl to chloromethyl groups were achieved with no detectable formation of dichloromethyl groups. Conversions of up to 61 percent of methyl to chloromethyl groups occur with less than 4.4 percent concomitant formation of dichloromethyl groups. The method has been applied to soluble, 1 percent cross-linked, and macroporous 20 percent cross-linked polymers.

25 Claims, No Drawings

METHOD OF CHLORINATING METHYL GROUPS OF METHYL VINYL AROMATIC POLYMERS

The United States Government has rights in this invention pursuant to Contract No. DAAG29-82-K-0133 with the United States Army Research Office.

BACKGROUND OF THE INVENTION

1. Field of the Invention

This invention relates to a safe, convenient and economical method for chlorinating pendant methyl groups of methyl vinyl aromatic polymers. More specifically, this invention relates to the phase transfer catalyzed chlorination of poly(p-methylstyrene).

2. Brief Description of the Prior Art

Chloromethylated polystyrenes are known as intermediates in the preparation and manufacture of ion exchange resins, supports for solid phase peptide synthesis, and supports for polymeric reagents and catalysts. Prior to the present invention, several methods of introducing the chloromethyl groups into polystyrenes have been proposed and employed with each method exhibiting serious problems and/or severe limitations. Lewis acid-catalyzed direct chloromethylation of a vinyl aromatic polymer represents the most prevalent commercial route of synthesis but requires the use of carcinogenic chloromethyl methyl ether and its unavoidable contaminant, the far more potent carcinogen bis(chloromethyl)ether. Methods of generating chloromethyl methyl ether in situ and alternate less volatile chloromethyl ethers of unknown toxicity have been proposed to lessen the hazard. Polymerization of vinyl benzyl chloride or other chloromethyl-substituted vinyl aromatic monomer (e.g., the copolymerization of chloromethyl styrenes available as a 70/30 m/p mixture) represents an alternative route to the production of chloromethylsubstituted polystyrenes. However, the chloromethylsubstituted vinyl aromatic monomers are expensive to produce and consequently, the method is seldom used. Another known method is disclosed in U.S. Pat. No. 3,812,061 wherein the chlorination of vinyl aromatic polymers having pendant methyl groups (e.g., cross-linked poly(vinyltoluene)), is achieved by the reaction of sulfuryl chloride in the presence of a free radical catalyst. However, sulfuryl chloride is a highly toxic and corrosive lachrymator.

SUMMARY OF THE INVENTION

In view of the problems associated with the prior art, the present Inventors have discovered a method of chlorinating the pendant methyl groups of methyl vinyl aromatic polymers using an aqueous hypochlorite solution and a phase transfer catalyst. As such, the method according to the present invention relative to the prior art is considered to be safe, convenient and economical.

Thus, the present invention provides a method of chlorinating pendant aromatic methyl groups of a vinyl aromatic polymer comprising the step of reacting a vinyl aromatic polymer having at least one pendant aromatic methyl group and wherein the polymer is dissolved or swollen in an organic solvent with an aqueous hypochlorite solution in the presence of a phase transfer catalyst.

The chlorination of the methyl groups of the poly(p-methylstyrene) according to the present invention can be conveniently performed using a sodium hypochlorite solution (e.g., conventional laundry or swimming pool bleach) as the aqueous phase and a simple halogenated organic solvent (e.g., chloroform, dichloroethane, or dichloropropane) as the polymer containing phase. The reaction proceeds smoothly at a pH of 7 to 10 at room temperature or above with the use of a quaternary ammonium salt as the phase transfer catalyst.

It is an object of the present invention to provide a method for chlorinating pendant methyl groups of methyl vinyl aromatic polymers. It is another object of the present invention to provide such a method that is selective with respect to the formation of the chloromethyl group. And, it is a further object of the present invention to provide such a method that is relatively safe, convenient and economical. Fulfillment of these objects and the presence and fulfillment of additional objects will become apparent upon complete reading of the specification and attached claims.

DESCRIPTION OF THE PREFERRED EMBODIMENT

The novel process for chlorination of the methyl groups of methyl vinyl aromatic polymers according to the present invention requires only the methyl vinyl aromatic polymer reactant dissolved or swollen in a simple organic solvent, an aqueous inorganic hypochlorite solution commonly available in the form of laundry bleach and swimming pool bleach and a phase transfer catalyst. As such, the novel process is far safer than prior art chloromethylation and sulfuryl chloride processes and far less expensive than the chloromethyl vinyl aromatic monomer process.

Polymer Reactant

The novel process according to the present invention involves the reaction of methyl vinyl aromatic polymers dissolved or swollen in an organic solvent with aqueous inorganic hypochlorite bleach solutions in the presence of a phase transfer catalyst. As such, it is critical that the substrate polymer employed as the reactant according to the present invention have a pendant methyl group. Typical substrate polymers include by way of example, but not limited thereto; polymerized mono- and poly-alkyl styrene such as poly(vinyltoluene) and poly(vinylxylene), copolymerized mono- and poly-alkyl styrene and the like. As such, the term polymer for purposes of the following description and the invention should be viewed as generic to both homopolymers and copolymers. These polymeric substrates may be linear or cross-linked polymers. When a suitable cross-linking agent is employed, the cross-linking agent is usually present in minor proportion and comprises a polyethylenically unsaturated material which is preferably divinylbenzene, or a substituted divinylbenzene such as trivinylbenzene, divinyltoluene, divinylxylene, divinyl ethyl benzene, and the like. Among the other cross-linking agents which can also be used in the present invention are divinylether, ethylene glycol dimethacrylate, ethylene glycol diacrylate, and trimethylolpropane trimethacrylate. The substrate copolymers suitable as reactants for the chlorination process of the present invention, as well as the finished or resulting chlorinated polymers, may have either a gel morphology or a sponge or macroreticular (macroporous) morphology as generally known in the art. As such, the amount of cross-linking agent may vary within wide limits, but ordinarily will be used in an amount of about one-half to about 90 percent by weight, preferably in an amount of about 1 to about 50 percent by weight, based on the total weight of monomers forming the copolymer; i.e., both the aromatic vinyl and cross-linking monomer in the copolymer.

Organic Solvent

The chlorination reaction according to the present invention is most readily carried out in the presence of a solvent to dissolve or swell the polymer reactant. Typical organic solvents include by way of example, but not limited thereto; chloroform, dichloromethane, dichloroethane, dichloropropane, benzene, chlorobenzene, dichlorobenzenes, nitrobenzene, and the like, or any other solvent which does not react appreciably with hypochlorite and thus lower the reaction yield. In the case of cross-linked polymers, a swelling solvent for the polymer is preferred; for example, but not limited thereto, a chlorinated alkane such as chloroform, dichloroethane, dichloropropane, mixtures thereof and the like or an aromatic solvent such as benzene, chlorobenzene, dichlorobenzenes, nitrobenzene, mixtures thereof and the like.

Hypochlorite Solution

Generally, the aqueous hypochlorite solution employed in the novel process according to the present invention is an inorganic hypochlorite salt. Typical aqueous hypochlorite solutions would include by way of example, but not limited thereto; sodium hypochlorite, calcium hypochlorite, potassium hypochlorite and the like. The preferred hypochlorite solutions are commercial laundry bleach and swimming pool bleach. The concentration of the hypochlorite may vary within wide limits, but ordinarily about 0.2 percent to about 20 percent solutions will be used, preferably, about 3.5 percent to about 15 percent hypochlorite solutions are used. The proportions of hypochlorite used, in terms of moles of hypochlorite per mole of substrate polymer or copolymer to be chlorinated, may vary over a wide range, but generally it will be in the range of about 1 to 20 moles per mole of polymer methyl groups.

Phase Transfer Catalyst

The phase transfer catalysts which are used or employed according to the present invention may include any of the quaternary ammonium salts such as tetrabutylammonium hydrogen sulfate, tetrabutylammonium bromide, tri($C_8$–$C_{10}$)alkyl-methylammonium chloride, benzyltriethylammonium chloride, benzyltrimethylammonium chloride, and the like. Other useful phase transfer catalysts are cyclic polyethers known as crown ethers, poly(ethylene glycol)s, poly(ethylene oxide)s, and linear and cyclic polyether-amines in which the amine groups are tertiary amines. The particularly preferred phase transfer catalysts in order of observed reactivity are benzyltriethylammonium chloride, tetrabutylammonium hydrogen sulfate and tetrabutylammonium bromide.

Reaction Conditions

The temperature range for the chlorination reaction according to the present invention can vary over a wide range, but generally it will be in the range of about −20° to 150° C., and preferably, from 0 to 100° C. The pH range for the process according to the present invention can vary over a wide range, but generally it is about 5 to 12, and preferably about 7 to 10.

The following Examples I and II and additional experimental runs and data found in Table I are intended to further illustrate the novel method and results of the method for chlorinating pendant methyl groups of methyl vinyl aromatic polymers according to the present invention. Example III and additional data found in Table II are intended for comparison purposes illustrating the prior art method of chlorinating pendant methyl groups by the use of sulfuryl chloride. The polymers having pendant methyl groups to be subsequently chlorinated in the following Examples were prepared from p-methylstyrene (supplied by Mobil Chemical Company as PMSA25 monomer) and the crosslinking agent was a 55 to 60 percent active divinylbenzene (supplied by Polysciences). Monomers were freshly distilled under vacuum prior to polymerization. p-Methylstyrene was homopolymerized and copolymerized in suspension with divinylbenzene to a 1 percent cross-linked gel or to a 20 percent cross-linked macroporous resin by methods identical with those used for cross-linked polystyrenes as described in T. Balakrishnan and W. T. Ford, Journal of Applied Polymer Science, Vol. 27, 133–138 (1982). In each case, the percent cross-linking reported is weight percent of active divinylbenzene. The 20 percent cross-linked macroporous polymer was prepared with 35 weight percent 4-methyl-2-pentanol in the monomer phase. Swelling ratios were determined by volume as swollen volume in deuterchloroform vs. dry volume with a precision of ±0.2.

The polymers used as reactants in the chlorination reaction of Examples I and II and Table I were dissolved or swollen in a halogenated solvent and treated with an excess of either laundry bleach or swimming pool bleach in the presence of a phase transfer catalyst. By iodometric titration, the laundry bleach (CLOROX) contained 3.5 weight percent (0.51 M) sodium hypochlorite and the swimming pool bleach (10 percent hypochlorite solution supplied by MidAmerica Chemical, Inc., Oklahoma City, Okla.) contained 9.4 weight percent (1.47 M) sodium hypochlorite. The phase transfer catalysts and reagent grade solvents were used as received from Aldrich Chemical Co. (PTC, $ClCH_2CHClCH_3$), Fisher Scientific ($CHCl_3$) and Eastman ($CLCH_2CH_2Cl$).

For analysis of the degree of chlorination, the peak areas due to the unreacted methyl carbons at 21.1 ppm, the chloromethyl carbons at 46.1 ppm, and the dichloromethyl carbons at 71.7 ppm were compared in 75 MHz carbon-13 NMR spectra. Carbon-13 NMR spectra of polymers dissolved or swollen in deutrerochloroform were run at 75.43 MHz on a Varian XL-300 spectrometer at 24° C. using 16 mm o.d. tubes, 8K data points in the fid, a 38 μs 90° pulse width, a 5s delay between acquisitions, 100–1400 acquisitions per spectrum and a line broadening factor of 4 Hz. Peak areas were measured by triangulation with correction of the baseline of the chloromethyl peak for the underlying backbone methylene carbon resonances. Analyses were performed with full proton decoupling, and peak areas were corrected for nuclear Overhauser enhancement factors. The NOE's were independently determined to be 1.674 and 1.816 (peak areas with full proton decoupling/peak areas with proton decoupling only during data acquisition) for the methyl and chloromethyl carbon peaks in the 1 percent cross-linked gel polymers. The carbon-13 NMR spectra were analyzed for the presence of signals of other carbon functional groups that might be expected, but no signals are found in the regions of 96 ppm for $ArCCl_3$, 173 ppm for $ArCO_2H$, 192 ppm ArCHO, 54 ppm for —CHCl— in backbone, or 68 ppm for —C(Ar)Cl— in backbone.

Selected samples were subjected to combustion analysis for chlorine. Elemental analyses were performed by Galbraith Laboratories (Knoxville, Tenn.). Infrared spectra of the polymers were recorded with KBr discs on a PerkinElmer model 681 spectrophotometer. Infrared spectra of the polymers were analyzed for the bands that could be attributed to backbone C—Cl bonds, but none could be found.

Chlorination of 1 Percent Cross-linked Poly(p-methylstyrene) With Laundry Bleach (Experiment 9)

EXAMPLE I

In a 1 L round-bottom flask fitted with a mechanical stirrer having a teflon blade 1 cm above the bottom of the flask, 5.00 g of the polymer (8.31 mequiv/g) was swollen in 100 mL of chloroform under argon atmosphere. 400 mL of CLOROX bleach (3.5 percent sodium hypochlorite solution) was neutralized to pH 8.47 with concentrated hydrochloric acid and added to the flask. After addition of 1.899 g (8.34 mmol) of benzyltriethylammonium chloride, the reaction mixture was stirred at 210 rpm at 25° C. under argon for 16.1 hours. The reaction mixture was then filtered. The polymer beads were washed with methanol three times, water three times, dichloromethane followed by 3/2 dichloromethane/methanol, methanol and water five times and methanol three times. The polymer beads were dried at 50° C. under vacuum to give 5.091 g of chlorinated poly(p-methylstyrene).

Chlorination of 1 Percent Cross-linked Poly(p-methylstyrene) With Swimming Pool Bleach (Experiment 15)

EXAMPLE II

In a manner analogous to Example I, just enough 1,2-dichloroethane (33 mL) was used to swell 5.00 g of the 1 percent cross-linked polymer in a 500 mL flask. 200 mL of the 9.4 percent sodium hypochlorite solution (swimming pool bleach) and 0.491 g (2.156 mmol) of benzyltriethylammonium chloride were employed in the procedure as indentically described in Example I.

Data from Examples I and II and fourteen similar experimental runs are presented in Table I. All percentages are by weight unless otherwise stated.

Chlorination of Methyl Groups of Methyl Vinyl Aromatic Polymers Using Sulfuryl Chloride.

Chlorination of 1 Percent Cross-linked Poly(p-methylstyrene) with $SO_2Cl_2$ (Experiment 18)

EXAMPLE III

To 5.00 g of 1 percent divinylbenzene cross-linked poly(p-methylstyrene) (8.31 mequiv/g) as added 50 mL of benzene, followed by addition of 70 mg of azobisisobutyronitrile (AIBN). The mixture was stirred at room temperature under argon for 15 minutes. The reaction mixture was then warmed to 60° C. followed by slow addition of a solution of 104 mg of AIBN and 5.2 mL of $SO_2Cl_2$ (Eastman Organic Chemicals) in 5 mL benzene over a period of 1 hour. The reaction mixture was stirred at 60° C. for one and a half hours, cooled to room temperature and quenched with cold methanol. The polymer was then filtered and washed with methanol three times, dichloromethane twice, and methanol three times. The polymer was then dried at 68° C. under vacuum for 15 hours. Table II presents the resulting data for Example III and an additional experimental run involving a shorter reaction time.

TABLE II

CHLORINATION OF POLY (P—METHYLSTYRENE) WITH $SO_2Cl_2$

| Experiment | Time h | mequiv Cl/g By NMR | By Cl anal | Yield, % | By NMR Anal $CH_2Cl$ | $CHCl_2$ |
|---|---|---|---|---|---|---|
| 17 | 0.4 | 2.97 | 2.76 | 36.8 | 1.6 | |
| 18 | 2.5 | 5.71 | 7.13 | 72.1 | 6.7 | |

Results and Conclusions

From the above data, it is concluded that the methyl groups of the soluble, 1 percent cross-linked gel, and 20 percent cross-linked macroporous poly(p-methylstyrene) can be chlorinated by the novel reaction according to the present invention. Chloromethyl contents suitable for use of the 1 percent cross-linked gel for solid

TABLE I

CHLORINATION OF POLY(P-METHYLSTYRENE)[a] WITH HYPOCHLORITE BLEACH SOLUTIONS

| EXPERIMENT | SOLVENT[b], mL | % HYPOCHLORITE, mL | PHASE TRANSFER CATALYST[c], mmol | TEMP °C. | TIME h | MEQUIV Cl/G OF POLYMER BY NMR ANALYSIS | BY CHLORINE ANALYSIS | YIELD, % (By NMR Analysis) $CH_2Cl$ | $CHCl_2$ |
|---|---|---|---|---|---|---|---|---|---|
| 1[d] | C, 100 | 3.5, 400 | TBAHS, 4.3 | 25 | 2 | 0.95 | nd | 11.7 | 0 |
| 2 | C, 100 | 3.5, 400 | TBAHS, 4.1 | 25 | 6.4 | 0.72 | nd | 8.9 | 0 |
| 3 | C, 100 | 3.5, 400 | TBAHS, 8.3 | 25 | 6.5 | 1.53 | nd | 19.4 | 0 |
| 4 | C, 100 | 3.5, 400 | TBAB, 4.2 | 25 | 6.5 | 0.28 | nd | 3.4 | 0 |
| 5 | C, 100 | 3.5, 400 | BTEAC, 4.2 | 25 | 6.5 | 0.87 | nd | 10.8 | 0 |
| 6 | C, 100 | 3.5, 400 | BTEAC, 4.2 | 25 | 13 | 1.22 | 1.11 | 15.3 | 0 |
| 7 | C, 100 | 3.5, 400 | BTEAC, 4.2 | 25 | 23.2 | 1.58 | nd | 20.2 | 0 |
| 8 | C, 100 | 3.5, 400 | BTEAC, 4.2 | 25 | 47 | 2.33 | nd | 25.1 | 2.7 |
| 9 | C, 100 | 3.5, 400 | BTEAC, 8.3 | 25 | 16.1 | 1.86 | 1.59 | 21.9 | 1.0 |
| 10 | DCE, 100 | 3.5, 400 | BTEAC, 8.4 | 68 | 17 | 3.95 | 4.79 | 47.3 | 3.8 |
| 11 | DCE, 100 | 3.5, 400 | TBAHS, 8.4 | 68 | 17 | 2.24 | nd | 27.2 | 1.0 |
| 12 | DCP, 100 | 3.5, 400 | BTEAC, 8.4 | 80 | 16 | 3.03 | nd | 38.7 | 1.0 |
| 13 | DCE, 100 | 9.4, 400 | BTEAC, 8.4 | 55 | 8 | 6.28 | 7.91 | 72.9 | 11.8 |
| 14 | DCE, 30 | 9.4, 200 | BTEAC, 2.1 | 23 | 5 | 3.27 | 3.87 | 41.0 | 1.7 |
| 15 | DCE, 33 | 9.4, 200 | BTEAC, 2.2 | 23 | 16.2 | 4.83 | 6.28 | 60.8 | 4.4 |
| 16[e] | DCE, 16 | 9.4, 200 | BTEAC, 1.5 | 23 | 25 | nd | 4.99 | nd | nd |

Footnotes to Table I:
[a] 5 g of 1 percent divinylbenzene cross-linked poly(p-methylstyrene), 8.31 mequiv/g of polymer
[b] C = Chloroform; DEC = 1,2-Dichloroethane; DCP - 1,2-Dichloropropane
[c] TBAHS = Tetrabutylammonium hydrogen sulfate; TBAB = Tetrabutylammonium bromide; BTEAC = Benzyltriethylammonium chloride
[d] 5 g of linear poly(p-methylstyrene) homopolymer
[e] 5 g of 20 percent divinylbenzene cross-linked macroporous poly (p-methylstyrene), 5.52 mequiv/g of the polymer
nd not determined The following Example III is presented as being illustrative of the prior art process for chlorinating pendant phase peptide synthesis and for most polymer-supported reagents and catalysts can be achieved with no detectable dichloromethyl groups by reaction with 3.5 percent sodium hypochlorite (laundry bleach) at room temperature. Up to 20 percent conversion of methyl to chloromethyl groups with no dichloromethyl groups was attained (Experiment 7). The relative activities of the phase transfer catalysts are benzyltriethylammonium chloride > tetrabutylammonium hydrogen sulfate > tetrabutylammonium bromide (Experiments 2, 4, 5, 10 and 11). With a 3.5 percent sodium hypochlorite (laundry bleach) and 1,2-dichloroethane as swelling solvent for the 1 percent cross-linked gel polymer, the degree of chlorination attained at 68° C. was 47 percent of the methyl groups converted to chloromethyl and 4 percent converted to dichloromethyl groups (Experiment 10). The 9.4 percent sodium hypochlorite (swimming pool bleach) is far more active than the 3.5 percent sodium hypochlorite (laundry bleach). A 73 percent conversion of methyl to chloromethyl groups with 12 percent dichloromethyl groups was obtained 55° C. (Experiment 13), and a 61 percent conversion of methyl to chloromethyl groups with 4 percent dichloromethyl groups was obtained at room temperature (Experiment 15). A 41 percent conversion of methyl to chloromethyl groups was obtained with less than 2 percent conversion to dichloromethyl groups (Experiment 14).

It is further concluded that chlorination has little effect on the swelling of the 1 percent cross-linked polymers in chloroform and does not render the soluble poly(pmethylstyrene) insoluble. These results indicate no appreciable secondary cross-linking of the polymer. In contrast, the prior art chloromethylation of polystyrene proceeds with significant secondary cross-linking.

In comparing Table I to Table II, it is concluded that sulfuryl chloride and phase transfer catalyzed sodium hypochlorite both introduce some chlorine at undetermined sites at conversions to $CH_2Cl$ higher than 20 percent. The excess chlorine reported in Table I and II may be on the polymer backbone, but cannot be detected. It is postulated that the backbone chlorinated $^{13}C$ nuclei give severely broadened indetectable NMR peaks due to low rotation mobility about C—C bonds. In any event, the method according to the present invention appears to yield chloromethylation compositions analogous to the $SO_2Cl_2$ process. Thus, chlorination of poly(p-methylstyrene) with commercial laundry or swimming pool bleach solutions and a phase transfer catalyst provides a much safer alternative to $SO_2Cl_2$ and certainly, much safer than the use of chloromethyl methyl ether and far more economical than direct polymerization of chloromethylsubstituted vinyl monomers.

Having thus described the invention with a certain degree of particularity, it is to be understood that the invention is not limited to the embodiments set forth herein for purposes of exemplification, but is to be limited only by the scope of the attached claim, including a full range of equivalents to which each element thereof is entitled.

We claim:

1. A method of chlorinating pendant aromatic methyl groups of a vinyl aromatic polymer comprising the step of reacting a vinyl aromatic polymer having at least one pendant aromatic methyl group and wherein said polymer is dissolved or swollen in an organic solvent with an aqueous hypochlorite solution in the presence of a phase transfer catalyst.

2. A method of claim 1 wherein said vinyl aromatic polymer having at least one pendant aromatic methyl group is selected from the group consisting of poly(vinyl toluene), poly(vinyl xylene), copolymers of poly(vinyl toluene), copolymer of poly(vinyl xylene) and mixtures thereof.

3. A method of claim 1 wherein said vinyl aromatic polymer having at least one pendant aromatic methyl group is poly(p-methylstyrene).

4. A method of claim 1 wherein said aqueous hypochlorite solution is selected from the group consisting of aqueous sodium hypochlorite solution, aqueous calcium hypochlorite solution, aqueous potassium hypochlorite solution and mixtures thereof.

5. A method of claim 1 wherein said aqueous hypochlorite solution contains from about 0.2 to about 20 weight percent sodium hypochlorite at a pH from about 5 to about 12.

6. A method of claim 1 wherein said phase transfer catalyst is selected from the group consisting of a quaternary ammonium salt, cyclic polyethers known as crown ethers, poly(ethylene glycol)s, poly(ethylene oxide)s, polyether-amines wherein the amine groups are tertiary amines and mixtures thereof.

7. A method of claim 1 wherein said phase transfer catalyst is selected from the group consisting of tetrabutylammonium hydrogen sulphate, tetrabutylammonium bromide, tri($C_8$–$C_{10}$)alkylmethylammonium chloride, benzyltriethylammonium chloride, benzyltrimethylammonium chloride and mixtures thereof.

8. A method of claim 1 wherein said vinyl aromatic polymer having at least one pendant aromatic methyl group is poly(p-methylstyrene), said aqueous hypochlorite solution contains from about 0.2 to about 20 weight percent sodium hypochlorite at a pH from about 7 to 10 and said phase transfer catalyst is selected from the group consisting of tetrabutylammonium hydrogen sulphate, tetrabutylammonium bromide, and benzyltriethylammonium chloride.

9. A method of claim 8 wherein said organic solvent is selected from the group consisting of chloroform, dichloromethane, 1,2-dichloroethane and 1,2-dichloropropane.

10. A method of chlorinating pendant aromatic methyl groups of a vinyl aromatic polymer comprising the steps of:
   (a) swelling or dissolving a vinyl aromatic polymer having at least one pendant aromatic methyl group in an organic solvent;
   (b) admixing an aqueous hypochlorite solution with the polymer containing organic phase produced in step (a); and
   (c) adding a phase transfer catalyst, thus promoting the chlorination of pendant aromatic methyl groups.

11. A method of claim 10 wherein said vinyl aromatic polymer having at least one pendant aromatic methyl group is selected from the group consisting of poly(vinyl toluene), poly(vinyl xylene), copolymers of poly(vinyl toluene), copolymers of poly(vinyl xylene) and mixtures thereof.

12. A method of claim 10 wherein said vinyl aromatic polymer having at least one pendant aromatic methyl group is poly(p-methylstyrene).

13. A method of claim 10 wherein said aqueous hypochlorite solution is selected from the group consisting of aqueous sodium hypochlorite solution, aqueous calcium hypochlorite solution, aqueous potassium hypochlorite solution and mixtures thereof.

14. A method of claim 10 wherein said aqueous hypochlorite solution contains from about 0.2 to about 20 weight percent sodium hypochlorite at a pH from about 5 to about 12.

15. A method of claim 10 wherein said phase transfer catalyst is selected from the group consisting of a quaternary ammonium salt, cyclic polyethers known as crown ethers, poly(ethylene glycol)s, poly(ethylene oxide)s, polyether-amines wherein the amine groups are tertiary amines and mixtures thereof.

16. A method of claim 10 wherein said phase transfer catalyst is selected from the group consisting of tetrabutylammonium hydrogen sulphate, tetrabutylammonium bromide, tri($C_8$–$C_{10}$) alkylmethylammonium chloride, benzyltriethylammonium chloride, benzyltrimethylammonium chloride, and mixtures thereof.

17. A method of claim 10 wherein said vinyl aromatic polymer having at least one pendant aromatic methyl group is poly(p-methylstyrene), said aqueous hypochlorite solution contains from about 0.2 to about 20 weight percent sodium hypochlorite at a pH from about 7 to 10 and said phase transfer catalyst is selected from the group consisting of tetrabutylammonium hydrogen sulphate, tetrabutylammonium bromide, and benzyltriethylammonium chloride.

18. A method of claim 17 wherein said organic solvent is selected from the group consisting of chloroform, dichloromethane, 1,2-dichloroethane and 1,2-dichloropropane.

19. A method of chlorinating the pendant aromatic methyl groups of poly(p-methylstyrene) comprising the steps of:
(a) swelling or dissolving poly(p-methylstyrene) in an organic solvent;
(b) admixing an aqueous hypochlorite solution with said swollen or dissolved poly(p-methylstyrene) phase produced in step (a); and
(c) adding a phase transfer catalyst, thus promoting the chlorination of pendant aromatic methyl groups of the poly(p-methylstyrene).

20. A method of claim 19 wherein said organic solvent is selected from the group consisting of chloroform, dichloromethane, dichloroethane, dichloropropane, benzene, chlorobenzene, dichlorobenzenes, nitrobenzene and mixtures thereof, wherein said aqueous hypochlorite solution is selected from the group consisting of aqueous sodium hypochlorite solution, aqueous calcium hypochlorite solution, aqueous potassium hypochlorite solution and mixtures thereof, and wherein said phase transfer catalyst is selected from the group consisting of a quaternary ammonium salt, cyclic polyethers known as crown ethers, poly(ethylene glycol)s, poly(ethylene oxide)s, polyether-amines wherein the amine groups are tertiary amines and mixtures thereof.

21. A method of chlorinating pendant aromatic methyl groups of a vinyl aromatic polymer comprising the steps of:
(a) reacting a vinyl aromatic polymer having at least one pendant aromatic methyl group with an aqueous hypochlorite solution in the presence of a phase transfer catalyst; and
(b) recovering a chlorinated vinyl aromatic polymer.

22. A method of claim 1 wherein said vinyl aromatic polymer is either linear or cross-linked.

23. A method of claim 1 wherein said vinyl aromatic polymer is cross-linked and has either a gel morphology or a sponge or macroreticular (macroporous) morphology.

24. A method of claim 1 wherein said organic solvent is selected from the group consisting of a chlorinated alkane and an aromatic solvent.

25. A method of claim 1 wherein said organic solvent is selected from the group consisting of chloroform, dichloromethane, dichloroethane, dichloropropane, benzene, chlorobenzene, dichlorobenzenes, nitrobenzene and mixtures thereof.

* * * * *